(12) United States Patent
Li et al.

(10) Patent No.: US 11,270,148 B2
(45) Date of Patent: Mar. 8, 2022

(54) VISUAL SLAM METHOD AND APPARATUS BASED ON POINT AND LINE FEATURES

(71) Applicant: Huawei Technologies Co., Ltd., Guangdong (CN)

(72) Inventors: Wanlong Li, Beijing (CN); Jianfei Li, Shenzhen (CN); Yajun Gao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/824,219

(22) Filed: Mar. 19, 2020

(65) Prior Publication Data

US 2020/0218929 A1 Jul. 9, 2020

Related U.S. Application Data

(63) Continuation of application No. PCT/CN2018/107097, filed on Sep. 21, 2018.

(30) Foreign Application Priority Data

Sep. 22, 2017 (CN) .......................... 201710868034.6
Mar. 6, 2018 (CN) .......................... 201810184021.1

(51) Int. Cl.
  *G06K 9/46* (2006.01)
  *G06K 9/00* (2006.01)
(52) U.S. Cl.
  CPC ....... *G06K 9/4609* (2013.01); *G06K 9/00664* (2013.01); *G06K 9/00744* (2013.01)
(58) Field of Classification Search
  USPC ........................................................ 382/103
  See application file for complete search history.

(56) References Cited

U.S. PATENT DOCUMENTS 8,520,931 B2 * 8/2013 Tateno ................. G06K 9/6204
                                                            382/154
8,855,406 B2 * 10/2014 Lim ........................ G06T 7/285
                                                            382/154

(Continued)

FOREIGN PATENT DOCUMENTS

CN      103886107 A    6/2014
CN      106444757 A    2/2017

(Continued)

OTHER PUBLICATIONS

Hyukdoo Choi et al. CV-SLAM using Line and Point Features, 2012 12th International Conference on Control, Automation and Systems, pp. 1465-1468.

(Continued)

*Primary Examiner* — Ishrat I Sherali
(74) *Attorney, Agent, or Firm* — Womble Bond Dickinson (US) LLP

(57) ABSTRACT

Systems and methods of visual simultaneous localization and mapping (SLAM) based on point and line features are disclosed. The method includes: receiving a visual image frame input by a camera device; extracting feature points and feature lines from the visual image frame; predicting a first pose of the camera device using the feature points; observing an extracted first feature line to determine a feature line measurement of the first feature line; obtaining a global feature line state vector set of the camera device, where the global feature line state vector set includes feature line state vectors of N historical feature lines, and N is a positive integer; and updating the first pose using the feature line measurement and the global feature line state vector set. In this way, feature point-based motion estimations and observation features of feature lines observed in an envi- (Continued)

ronment are integrated to update a pose of the camera device in real time, thereby improving visual SLAM accuracy.

19 Claims, 6 Drawing Sheets

(56) References Cited

U.S. PATENT DOCUMENTS

| | | | | |
|---|---|---|---|---|
| 9,031,782 | B1* | 5/2015 | Lemay | G01S 19/48 |
| | | | | 701/445 |
| 9,807,365 | B2* | 10/2017 | Cansizoglu | G06K 9/46 |
| 10,306,206 | B2* | 5/2019 | Mourikis | H04N 13/204 |
| 10,386,850 | B2* | 8/2019 | Heinla | G06T 7/73 |
| 10,726,264 | B2* | 7/2020 | Sawhney | G06K 9/00664 |
| 10,740,645 | B2* | 8/2020 | Ozog | G06T 7/74 |
| 10,885,682 | B2* | 1/2021 | Zang | G01C 21/30 |
| 2011/0150320 | A1* | 6/2011 | Ramalingam | G06T 7/75 |
| | | | | 382/154 |
| 2012/0106829 | A1* | 5/2012 | Lee | G05D 1/0274 |
| | | | | 382/153 |
| 2014/0003705 | A1* | 1/2014 | Taguchi | G06T 7/579 |
| | | | | 382/154 |
| 2015/0243044 | A1* | 8/2015 | Luo | G06T 7/246 |
| | | | | 382/107 |
| 2015/0269436 | A1* | 9/2015 | Kim | G06K 9/00624 |
| | | | | 382/103 |
| 2015/0371440 | A1* | 12/2015 | Pirchheim | G06T 7/73 |
| | | | | 345/419 |
| 2018/0161986 | A1* | 6/2018 | Kee | G06T 7/75 |
| 2018/0253107 | A1* | 9/2018 | Heinla | G06Q 10/0833 |
| 2020/0218929 | A1* | 7/2020 | Li | G06K 9/00664 |
| 2020/0341473 | A1* | 10/2020 | Raag | G01C 21/3407 |
| 2020/0349730 | A1* | 11/2020 | Chen | G06T 7/13 |
| 2021/0183100 | A1* | 6/2021 | Xue | G06T 7/75 |

FOREIGN PATENT DOCUMENTS

| | | |
|---|---|---|
| CN | 104077809 B | 4/2017 |
| CN | 106897666 A | 6/2017 |
| CN | 106909877 A | 6/2017 |

OTHER PUBLICATIONS

Xie xiaojia:"Stereo Visual SLAM Using Point and Line Features", Zhejiang University, Aug. 2017. with partial English translation. Total 87 pages.

Raul Mur-Artal et al. ORB-SLAM2: An Open-Source SLAM System for Monocular, Stereo, and RGB-D Cameras, IEEE Transactions on Robotics, vol. 33, No. 5, Oct. 2017, pp. 1255-1262.

Yan Lu et al. Robust RGB-D Odometry Using Point and Line Features, 2015 IEEE International Conference on Computer Vision, pp. 3934-3942.

Vivek Pradeep et al. Egomotion using Assorted Features, 2010 IEEE, pp. 1514-1521.

Yohann Salaün et al. Robust and Accurate Line- and/or Point-Based Pose Estimation without Manhattan Assumptions, ECCV 2016: Computer Vision—ECCV 2016 pp. 801-818.

Li Haifeng et al. PLP-SLAM:A Visual SLAM Method Based on Point-Line-Plane Feature Fusion, Robot, Feb. 2017. total 15 pages. With partial English translation.

* cited by examiner

VISUAL SLAM METHOD AND APPARATUS BASED ON POINT AND LINE FEATURES

CROSS-REFERENCE TO RELATED APPLICATIONS

This application is a continuation of International Application No. PCT/CN2018/107097, filed on Sep. 21, 2018, which claims priority to Chinese Patent Application No. 201710868034.6, filed on Sep. 22, 2017 and Chinese Patent Application No. 201810184021.1, filed on Mar. 6, 2018, the disclosures of which are incorporated herein by reference in their entireties.

TECHNICAL FIELD

This application relates to the field of image processing technologies, and in particular, to a visual simultaneous localization and mapping (SLAM) method and apparatus based on point and line features.

BACKGROUND

Currently, SLAM is a basic issue and research hotspot to achieve autonomous navigation, aiming at resolving a problem of how to perceive an ambient environment after entry into an unknown environment to build an incremental map and perform self-localization. There are many types of sensors used to sense the ambient environment. Because a camera device has advantages of low costs, a small size, and easy installation, a visual SLAM method becomes important research content in the field.

In a conventional visual SLAM theory, feature points in an environment are mainly used for mapping and localization. An advantage is that the feature points are easy to detect and track, while a disadvantage is that for environments of some man-made structures such as walls of a corridor, SLAM accuracy is severely affected because only information about feature points in the environments is considered.

SUMMARY

Embodiments of this application provide a visual SLAM method and apparatus based on point and line features, so that information about feature points and feature lines in a visual image frame can be integrated to improve visual SLAM accuracy.

Specific technical solutions provided in the embodiments of this application are as follows:

According to a first aspect, a visual SLAM method based on point and line features is provided. The method is applied to a camera device for capturing images of surroundings, and includes: receiving a current visual image frame input by a camera; extracting feature points and feature lines of the current visual image frame; predicting a first pose of the camera device by using the feature points; observing a first feature line, to determine a feature line observation quantity of the first feature line, where the first feature line is any one of the extracted feature lines; obtaining a global feature line state vector set in the current visual image frame, where the global feature line state vector set includes feature line state vectors of N historical feature lines, and N is a positive integer; and updating the first pose by using the feature line observation quantity and the global feature line state vector set, to obtain an updated first pose.

In the foregoing visual SLAM method, feature point-based motion estimations and observation features of feature lines observed in an environment are integrated, to update a pose of the camera device in real time. Compared with the prior art in which only motion estimations of feature points are considered, the method improves visual SLAM accuracy to some extent. In addition, observation features of observed historical feature lines are considered, so that loop closing constraints are achieved, robustness is improved, and visual SLAM accuracy is improved correspondingly.

In one embodiment, the method further includes: updating the global feature line state vector set by using the feature line observation quantity and the first pose, to obtain an updated global feature line state vector set.

In one embodiment, the method further includes: traversing the N historical feature lines, and sequentially calculating a Mahalanobis distance between each historical feature line and the first feature line, to obtain N Mahalanobis distances; and the updating the first pose by using the feature line observation quantity and the global feature line state vector set, to obtain an updated first pose includes: when a smallest Mahalanobis distance in the N Mahalanobis distances is less than a preset threshold, updating the first pose by using the feature line observation quantity and the global feature line state vector set, to obtain the updated first pose.

It should be understood that, in this design, a Mahalanobis distance algorithm is used to determine that an extracted feature line is previously observed. To be specific, when the smallest Mahalanobis distance is less than the preset threshold, it is considered that the first feature line is previously observed, so that the first pose estimated by using the feature points can be updated in real time by using the global feature line state vector set and the feature line observation quantity of the first feature line.

In one embodiment, the updating the first pose by using the feature line observation quantity and the global feature line state vector set, to obtain an updated first pose includes: calculating a deviation between a feature line state vector of a feature line corresponding to the smallest Mahalanobis distance and the feature line observation quantity; and updating the first pose and the global feature line state vector set based on the deviation by using a filtering method.

In this embodiment, the first pose and the global feature line state vector set can be updated by using an existing filtering method to obtain an optimal value.

In one embodiment, when the smallest Mahalanobis distance in the N Mahalanobis distances is not less than the preset threshold, adding the feature line observation quantity to the global feature line state vector set, to obtain the updated global feature line state vector set. In this design, when a first Mahalanobis distance is not less than the preset threshold, it indicates that the extracted first feature line is a newly observed feature line. Therefore, the global feature line state vector set is updated, so that the global feature line state vector set is optimized.

In one embodiment, the extracting feature lines of the current visual image frame may be implemented in the following process: extracting all line segments of the current visual image frame; merging, if any two extracted line segments satisfy a first preset condition, the any two line segments into a new line segment until there is no line segment that satisfies the first preset condition; and outputting, if the any two merged line segments satisfy a second preset condition, the any two merged line segments as a same feature line; or outputting, if the any two merged line segments do not satisfy the second preset condition, the any two line segments as two feature lines.

It should be understood that, in the foregoing feature line extraction method, different line segments belonging to a same straight line can be merged, and a duplicate feature line can be removed. Compared with an existing feature line extraction method, the foregoing feature line extraction method can improve feature line extraction accuracy and efficiency, and reduce redundant feature lines.

In one embodiment, the merging, if any two extracted line segments satisfy a first preset condition, the any two line segments into a new line segment includes: if a minimum distance between endpoints of the any two extracted line segments is less than a first preset value, a distance between the two line segments is less than a second preset value, and an angle between the any two line segments is less than a third preset value, merging the any two line segments into the new line segment.

In one embodiment, the outputting, if the any two merged line segments satisfy a second preset condition, the any two merged line segments as a same feature line includes: if an angle between the any two merged line segments is less than a fourth preset value, lengths of the two line segments are the same, an overlap of the two line segments is greater than a fifth preset value, and a distance between the two line segments is less than a sixth preset value, outputting the any two line segments as the same feature line.

In one embodiment, the observing the first feature line, to determine a feature line observation quantity of the first feature line includes: minimally representing the extracted first feature line by using orthogonal parameters, to obtain the feature line observation quantity.

In one embodiment, the obtaining a global feature line state vector set in the current visual image frame includes: during motion of the camera device, when the current visual image frame is a key frame and feature lines are observed in the current visual image frame, performing association and matching on the currently observed feature lines and previously observed historical feature lines, where the key frame is a frame in which a key action occurs during the motion of the camera device; for feature lines that succeed in matching, calculating a reprojection error between each of the currently observed feature lines and each of the previously observed historical feature lines, constructing a target function by using the reprojection error, minimizing the target function to obtain feature line state vectors of the currently observed feature lines, and updating the feature line state vectors to the global feature line state vector set; and for feature lines that fail in matching, obtaining feature line state vectors of the currently observed feature lines, and adding the feature line state vectors to the global feature line state vector set.

According to a second aspect, a visual SLAM apparatus based on point and line features is provided. The apparatus is applied to a camera device for capturing images of surroundings, and includes: a receiving unit, configured to receive a current visual image frame input by a camera; an extraction unit, configured to extract feature points and feature lines of the current visual image frame; a prediction unit, configured to predict a first pose of the camera device by using the feature points; a determining unit, configured to observe a first feature line, to determine a feature line observation quantity of the first feature line, where the first feature line is any one of the extracted feature lines; an obtaining unit, configured to obtain a global feature line state vector set in the current visual image frame, where the global feature line state vector set includes feature line state vectors of N historical feature lines, and N is a positive integer; and an update unit, configured to update the first pose by using the feature line observation quantity and the global feature line state vector set, to obtain an updated first pose.

In one embodiment, the update unit is further configured to: update the global feature line state vector set by using the feature line observation quantity and the first pose, to obtain an updated global feature line state vector set.

In one embodiment, the determining unit is further configured to: traverse the N historical feature lines, and sequentially calculate a Mahalanobis distance between each historical feature line and the first feature line, to obtain N Mahalanobis distances; and the update unit is specifically configured to: when a smallest Mahalanobis distance in the N Mahalanobis distances is less than a preset threshold, update the first pose by using the feature line observation quantity and the global feature line state vector set, to obtain the updated first pose.

In one embodiment, the update unit is specifically configured to: calculate a deviation between a feature line state vector of a feature line corresponding to the smallest Mahalanobis distance and the feature line observation quantity; and update the first pose and the global feature line state vector set based on the deviation by using a filtering method.

In one embodiment, the update unit is further configured to: when the smallest Mahalanobis distance in the N Mahalanobis distances is not less than the preset threshold, add the feature line observation quantity to the global feature line state vector set, to obtain the updated global feature line state vector set.

In one embodiment, in terms of extracting feature lines of the current visual image frame, the extraction unit is specifically configured to: extract all line segments of the current visual image frame; merge, if any two extracted line segments satisfy a first preset condition, the any two line segments into a new line segment until there is no line segment that satisfies the first preset condition; and output, if the any two merged line segments satisfy a second preset condition, the any two merged line segments as a same feature line; or output, if the any two merged line segments do not satisfy the second preset condition, the any two line segments as two feature lines.

In one embodiment, in terms of merging, if any two extracted line segments satisfy a first preset condition, the any two line segments into a new line segment, the extraction unit is specifically configured to: if a minimum distance between endpoints of the any two extracted line segments is less than a first preset value, a distance between the two line segments is less than a second preset value, and an angle between the any two line segments is less than a third preset value, merge the any two line segments into the new line segment.

In one embodiment, in terms of outputting, if the any two merged line segments satisfy a second preset condition, the any two merged line segments as a same feature line, the extraction unit is specifically configured to: if an angle between the any two merged line segments is less than a fourth preset value, lengths of the two line segments are the same, an overlap of the two line segments is greater than a fifth preset value, and a distance between the two line segments is less than a sixth preset value, output the any two line segments as the same feature line.

In one embodiment, the determining unit is specifically configured to: minimally represent the extracted feature lines by using orthogonal parameters, to obtain the feature line observation quantity.

In one embodiment, the obtaining unit is specifically configured to: during motion of the camera device, when the current visual image frame is a key frame and feature lines are observed in the current visual image frame, perform association and matching on the currently observed feature lines and previously observed historical feature lines, where the key frame is a frame in which a key action occurs during the motion of the camera device; for feature lines that succeed in matching, calculate a reprojection error between each of the currently observed feature lines and each of the previously observed historical feature lines, construct a target function by using the reprojection error, minimize the target function to obtain feature line state vectors of the currently observed feature lines, and update the feature line state vectors to the global feature line state vector set; and for feature lines that fail in matching, obtain a feature line state vectors of the currently observed feature lines, and add the feature line state vectors to the global feature line state vector set.

According to a third aspect, a visual SLAM processing device based on point and line features is provided. The processing device includes a transceiver, a processor, and a memory. The transceiver is configured to receive and send information; the memory is configured to store a program, an instruction, or code; and the processor is configured to execute the program, the instruction, or the code in the memory, to implement the method according to the first aspect or any possible implementation of the first aspect.

According to a fourth aspect, this application further provides a computer-readable storage medium. The computer-readable storage medium stores an instruction, and when the instruction is run on a computer, the computer is enabled to perform the method according to the first aspect or any possible design of the first aspect.

According to a fifth aspect, this application further provides a computer program product including an instruction. When the computer program product runs on a computer, the computer is enabled to perform the method according to the first aspect or any possible design of the first aspect.

DESCRIPTION OF EMBODIMENTS

Figure 1:
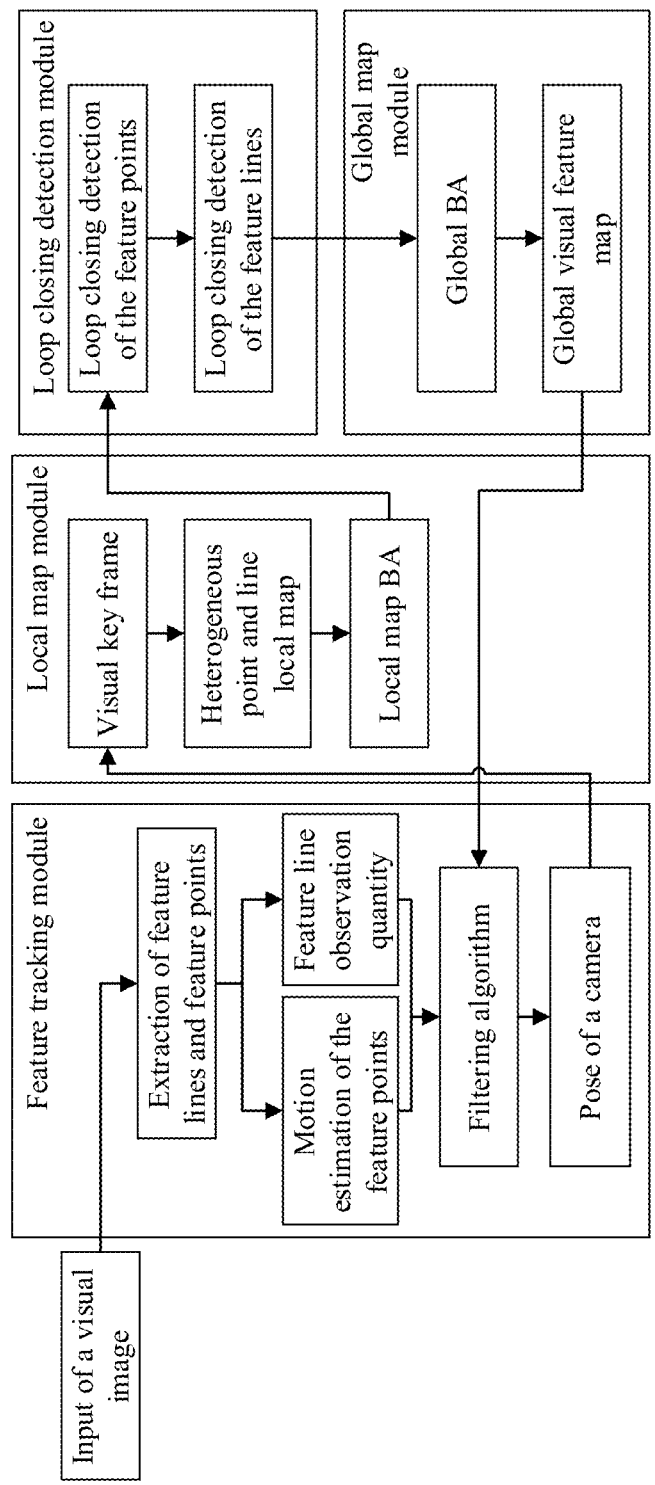
FIG. 1 is an architectural diagram of a visual SLAM system according to an embodiment of this application.

The following clearly describes the technical solutions in the embodiments of this application with reference to the accompanying drawings in the embodiments of this application.

The following describes related terms used in this application.

Visual SLAM: Visual SLAM refers to a representation method in which a position of a robot, a vehicle, or a mobile camera in an environment is determined by using an image that belongs to external information and a map of an explored area can be established simultaneously.

Visual odometry (VO): Visual odometry is also referred to as a front end (front end). The visual odometry is used to estimate camera motion between adjacent images frames and estimate a pattern of a local map. In feature point-based visual odometry, during estimation of camera motion between adjacent images, feature points of two adjacent key frames are first extracted, then matching is performed on the feature points, and after the feature points are matched, two pixel sets in a one-to-one correspondence may be obtained. Subsequently, the camera motion is calculated based on the two matched pixel sets. Typical 2D-2D matching is performed on monocular ORB features by using an epipolar geometry method. In this process, 3D spatial position information of the pixels is not used. After the camera motion is obtained, spatial position of each feature point can be calculated based on information about the motion. This operation is referred to as triangulation. An equation, namely, p'Ep=0, of an essential matrix E is constructed by using an epipolar geometry constraint. An initial value of E is first obtained by solving the equation. Then, modification is performed based on a feature of E, to obtain a modified essential matrix $E \%=U diag\{1, 1, 0\}V^T$. Then the essential matrix is decomposed, to obtain a rotation and a translation between two frames of images. In this way, the visual odometry is implemented.

Pose: A pose refers to a position and an orientation, where the position refers to a translation in three directions of x, y, and z in a coordinate system, and the orientation refers to a rotation in the three directions of x, y, and z in the coordinate system.

Key frame: A key frame (key frame) is a video frame that is very different from a previous video frame in a video sequence, and represents a new position. The key frame is also used to effectively estimate a pose of a camera and reduce redundant information.

Visual bag-of-words model: In visual SLAM, a bag-of-words model is mostly used to search for feature points, and similar images can be quickly found.

Mahalanobis distance: A Mahalanobis distance means a covariance distance of data, and is a method for effectively calculating a similarity of two unknown sample sets. If a covariance matrix is an identity matrix, the Mahalanobis distance reduces to a Euclidean distance.

Graph optimization (graph optimization): Graph optimization is a manner of presenting an optimization problem as a graph (graph). The graph herein is a graph in the graph theory. A graph includes vertices (vertex) and edges (Edge) connecting the vertices. Further, the vertex is used to represent an optimization variable, and the edge is used to represent an error term. Therefore, for any non-linear least squares problem in the foregoing form, a graph corresponding to the problem may be constructed. The graph optimization is also referred to as a back end.

Bundle adjustment (BA): Bundle adjustment refers to a process in which an optimal 3D model and camera parameters (including an intrinsic parameter and an extrinsic parameter) are extracted during visual reconstruction and bundles of light rays (bundles of light rays) reflected from each feature point finally converge on an optical center of a camera after optimal adjustment (adjustment) is performed on an orientation of the camera and a spatial position of the feature point.

Extended Kalman filter (EKF): A Kalman filter is an efficient recursive filter that can estimate a state of a dynamic system from a series of incomplete and noise-containing measurements. When a state equation or measurement equation is non-linear, an extended Kalman filter (EKF) is usually used to estimate the state of the dynamic system. The EKF performs first-order linear truncation on a Taylor expansion of a non-linear function, ignoring remaining higher-order terms, so that a non-linear problem is transformed into a linear problem. A Kalman linear filtering algorithm can be applied to a non-linear system.

Drift error: Affected by measurement noise of a sensor, an estimation error at a previous moment is added to motion in a later time. This phenomenon is referred to as drift, and a formed error is referred to as a drift error.

Data association: Data association refers to a process in which observation information of a sensor at different moments is associated, and is also referred to as a re-observation process.

The embodiments of this application are an improvement of conventional SLAM, and provide a visual SLAM method and apparatus based on point and line features, so that information about feature points and feature lines in a visual image frame can be integrated to improve visual SLAM accuracy. The visual SLAM solutions based on point and line features in the embodiments of this application may be applied to mapping and localization for automated driving, a mobile robot, and a drone, and may also be applied to augmented reality and virtual reality scenes of a mobile terminal.

An embodiment of this application provides a visual SLAM system. The system specifically includes a feature tracking module, a local map module, a loop closing detection module, and a global map module. The following specifically describes a functional implementation of each module.

(1) Feature Tracking Module

After receiving a video image frame, the feature tracking module reads and preprocesses the video image frame, to extract feature points and feature lines of the video image frame. The feature tracking module searches consecutive video image frames for similar feature points and feature lines to perform association and matching on the similar feature points and feature lines, and estimates motion of a camera device, to track a pose of the camera device. The feature tracking module is mainly configured to output the pose of the camera device in real time, sift out a key frame, and estimate the motion of the camera device.

(2) Local Map Module

The local map module mainly selects a key frame within a local range, calculates point cloud information of the key frame, constructs a local map, and obtains a heterogeneous feature point and feature line map by using a local BA optimization algorithm.

(3) Loop Closing Detection Module

The loop closing (loop closing) detection module is mainly configured to determine whether a scenario currently photographed by the camera device is a previously photographed scenario. An accumulated drift error caused by the motion of the camera device can be effectively eliminated through loop closing detection. Main steps are as follows:

Step 1: Perform loop closing detection on observed feature points by using a bag-of-words model, and calculate a similarity between a current key frame and a candidate key frame by using the bag-of-words model.

Step 2: Determine a Mahalanobis distance between feature lines by using a covariance, to perform loop closing detection on feature lines in an environment.

Step 3: Combine the two types of loop closing detection to obtain a more robust result.

(4) Global Map Module

The global map module is mainly configured to obtain all key frames on an entire motion path, calculate a global consistent trajectory and map, optimize all the key frames, feature points, and feature lines by using a global BA optimization algorithm after the loop closing detection, and update a global feature line state vector set obtained through optimization to the feature tracking module.

Figure 2:
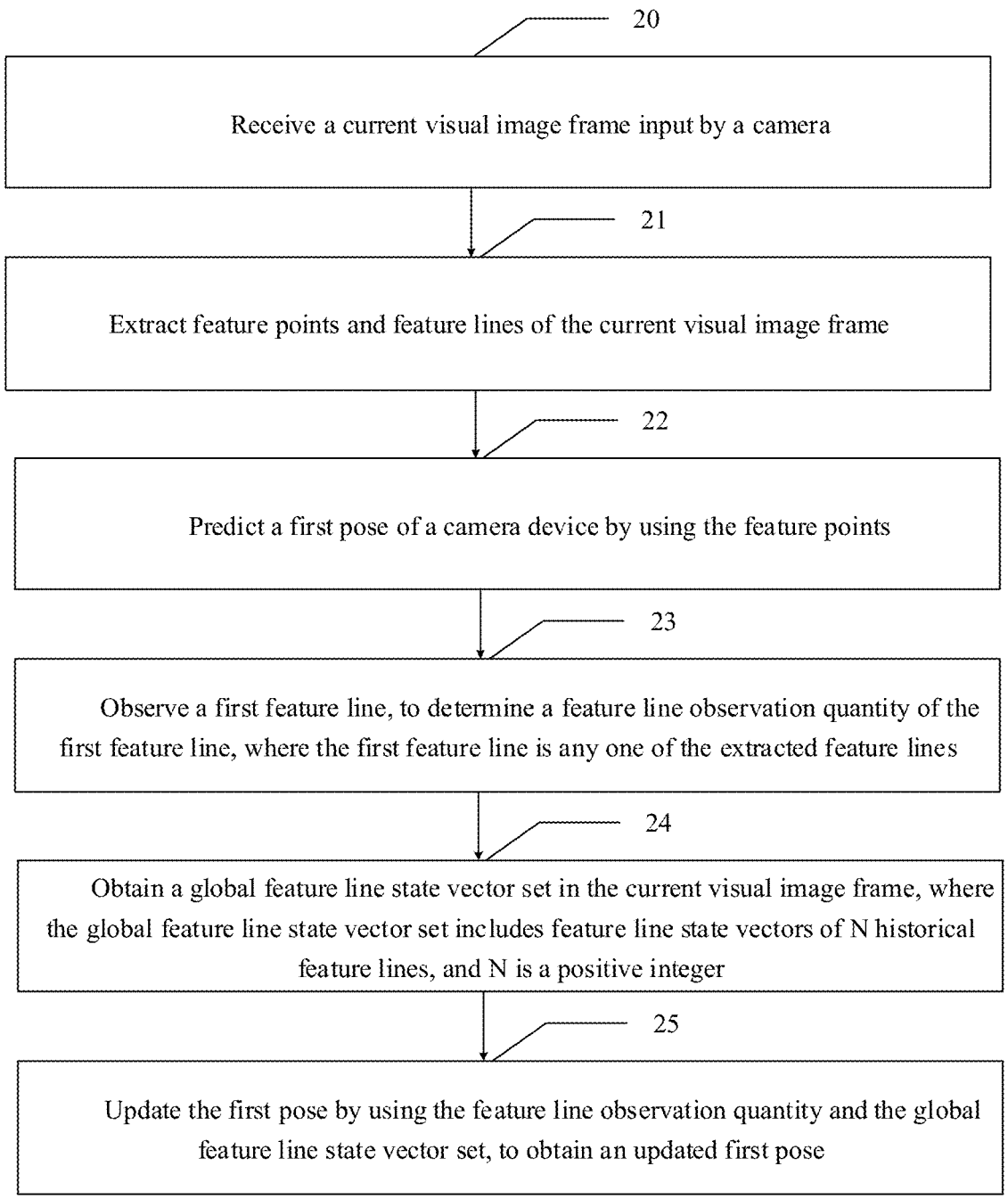
FIG. 2 is a flowchart of a visual SLAM method based on point and line features according to an embodiment of this application.

Based on the visual SLAM system shown in FIG. 1, FIG. 2 shows a visual SLAM method based on point and line features according to an embodiment of this application. The method is applied to a camera device for capturing images of surroundings, and includes the following steps.

Step 20: Receive a current visual image frame input by a camera.

Step 21: Extract feature points and feature lines of the current visual image frame.

The feature point refers to an environmental element that exists in a form of a point in an environment in which the camera device is located. The feature line refers to an environmental element that exists in a form of a line in the environment in which the camera device is located.

In one embodiment, during extraction of the feature points of the current visual image frame in Step 21, in this embodiment of this application, the feature points of the input current visual image frame are extracted and described by using an existing oriented FAST and rotated BRIEF (ORB) algorithm, the feature points are extracted by using an improved features from accelerated segment test (FAST) algorithm, and the feature points are described by using a binary robust independent elementary features (BRIEF) algorithm.

Figure 3A:
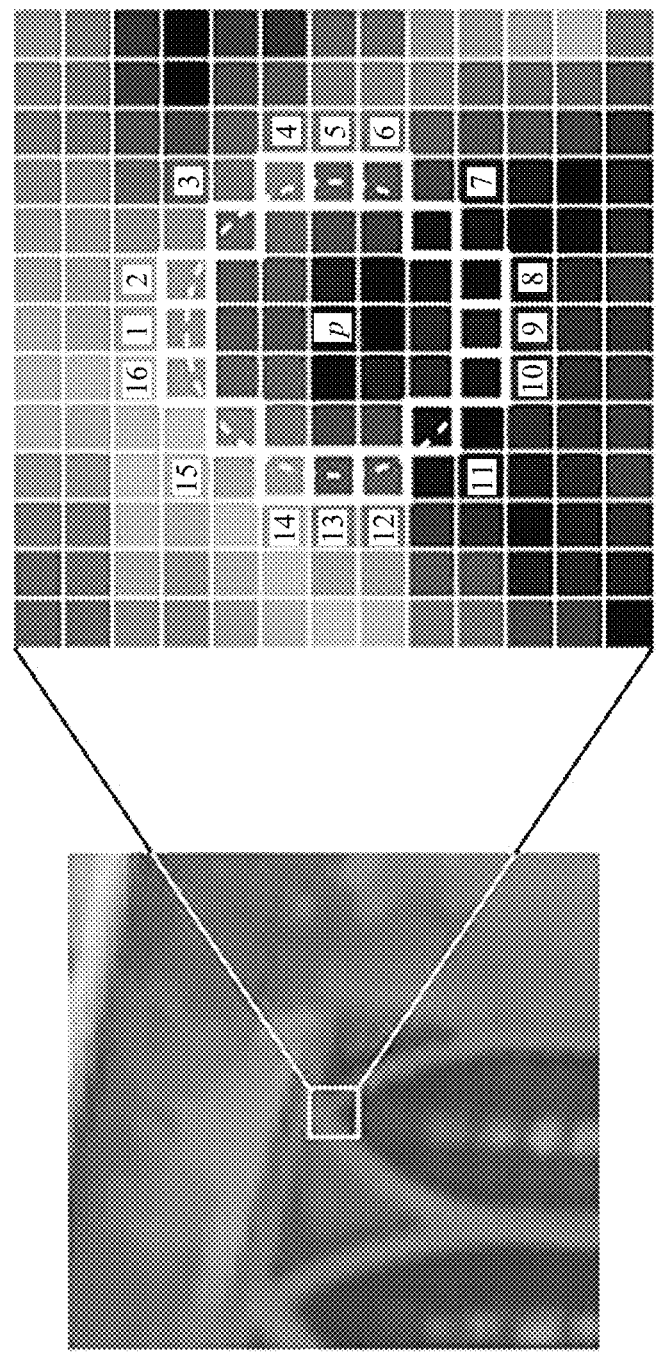
FIG. 3A is a schematic diagram of a method for extracting a feature point of a current visual image frame according to an embodiment of this application.

In one embodiment, the improved FAST algorithm is as follows:

Step 1: Perform crude extraction. In this step, a large quantity of feature points can be extracted, but a majority of the feature points have low quality. The following describes an extraction method. A point P is selected from an image, and as shown in FIG. 3A, a method for determining whether the point is a feature point is to draw a circle with a radius of three pixels and with P as a center of the circle. If n consecutive pixels on a circumference of the circle each have a grayscale value greater than or less than a grayscale value of the point P, P is considered as the feature point. Usually, n is set to 12. To accelerate the extraction of the feature points and quickly exclude a non-feature point, grayscale values of pixels at positions 1, 9, 5, and 13 are first detected. If three or more of the pixels at the four positions each have a grayscale value greater than or less than the grayscale value of the point P, P is the feature point. If the foregoing condition is not satisfied, the point is directly excluded.

Step 2: Sift out an optimal feature point by using a machine learning method. Briefly, a decision tree is trained by using an ID3 algorithm, and 16 pixels on a circumference of a feature point are input into the decision tree, to sift out an optimal FAST feature point.

Step 3: Remove relatively dense local feature points through non-maximum suppression. A plurality of feature points at close positions are removed by using a non-maximum suppression algorithm. A response value of each feature point is calculated. A calculation manner is to calculate a sum of absolute values of deviations between the feature point P and 16 surrounding pixels of the feature point P. Among relatively close feature points, a feature point with a relatively large response value is remained, and another feature point is deleted.

Step 4: Achieve scale invariance of feature points. A pyramid is established, to achieve multi-scale invariance of the feature points. A scale factor (which is 1.2 by default in OpenCV) and a quantity n of levels (which is 8 by default in OpenCV) of the pyramid are set. An original image is scaled down based on the scale factor to obtain n levels of images. A scaled-down image is I'=I/scaleFactork (k=1, 2, . . . , and n). Total feature points are extracted from the n levels of images of different scales as oFAST feature points of this image.

Step 5: Achieve rotation invariance of the feature points. The ORB algorithm proposes to determine a direction of a FAST feature point by using a moment (moment) method. To be specific, a centroid, of the feature point, within an r radius is calculated by using a moment, and a vector from coordinates of the feature point to the centroid is formed as the direction of the feature point. The moment is defined as follows:

$$m_{pq} = \sum_{x,y \in r} x^p y^q I(x, y),$$

where I(x, y) represents an image grayscale expression, and a centroid of the moment is:

$$C = \left(\frac{m_{10}}{m_{00}}, \frac{m_{01}}{m_{00}}\right).$$

It is assumed that coordinates of a corner point are origin O, an angle of the vector is the direction of the feature point. A calculation formula is as follows:

$$\theta = \arctan\left(\frac{m_{01}}{m_{00}} \Big/ \frac{m_{10}}{m_{00}}\right) = \arctan(m_{01}/m_{10}).$$

In one embodiment, Step 21 in which the feature lines of the current visual image frame are extracted may be implemented in the following process:

S1: Extract all line segments of the image frame. Optionally, in this embodiment of this application, all the line segments of the image frame may be extracted by using an existing line segment detector (LSD) method.

In one embodiment, an LSD extraction algorithm is as follows:

1. Perform Gaussian downsampling on an input image at a scale of 0.8.
2. Calculate a level line angle and a level line orientation (level-line orientation) that are of each point.
3. Perform pseudo-ordering (pseudo-ordered) on all the points based on level line angles, establish a status list, and set states of all the points to UNUSED.
4. Set, to USED, a corresponding state that is in the status list and that is of a point with a level line angle less than p.
5. Extract a point with a largest level line angle (at the top of the pseudo-ordering) in the list as a seed (seed), and set the seed to USED in the status list.

Do the following steps:
a. Use the seed as a start point, search for surrounding UNUSED points whose directions fall within a range of thresholds [−t, t], and change statuses of the points to USED.
b. Generate a rectangle R including all satisfying points.
c. Determine whether a density of aligned points (aligned points) satisfies a threshold D, and if the density of aligned points does not satisfy the threshold D, cut (cut) R into a plurality of rectangular frames until the density of aligned points satisfies the threshold D.
d. Calculate an NFA (number of false alarms).
e. Change R to decrease the NFA until NFA≤ε, and add changed R to an output list.

S2: Merge, if any two extracted line segments satisfy a first preset condition, the any two line segments into a new line segment until there is no line segment that satisfies the first preset condition.

In one embodiment, if a minimum distance between endpoints of the any two extracted line segments is less than a first preset value, a distance between the two line segments is less than a second preset value, and an angle between the any two line segments is less than a third preset value, the any two line segments are merged into the new line segment.

Figure 3B:
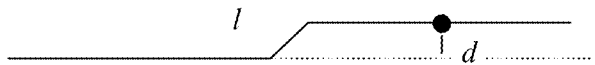
FIG. 3B is a schematic diagram of line segment merging according to an embodiment of this application.

In the foregoing step, a plurality of line segments belonging to a same line can be merged. For example, as shown in FIG. 3B, 1 represents a minimum distance between endpoints of two line segments, and d represents a distance from a center point of one line segment to the other line segment. When 1 is less than a specified threshold, d is less than a specified threshold, and an angle between the two line segments is also less than a specified threshold, it is considered that the two line segments belong to a same line. The two line segments are merged into a new line segment.

S3: Output, if the any two merged line segments satisfy a second preset condition, the any two merged line segments as a same feature line; or output, if the any two merged line segments do not satisfy the second preset condition, the any two line segments as two feature lines.

In one embodiment, if an angle between the any two merged line segments is less than a fourth preset value, lengths of the two line segments are the same, an overlap of the two line segments is greater than a fifth preset value, and a distance between the two line segments is less than a sixth preset value, the any two line segments are output as the same feature line.

For example, when any two line segments $l_1$ and $l_2$ satisfy the following conditions, it is considered that $l_1$ and $l_2$ are a same line segment:

(1) An angle between $l_1$ and $l_2$ is less than a given threshold Φ.

(2) Lengths of the two line segments are basically the same, and $$\frac{\min(\|l_1\|, \|l_2\|)}{\max(\|l_1\|, \|l_2\|)} > \tau.$$

(3) An overlap of $l_1$ and $l_2$ is greater than a specific threshold, that is, $$\frac{l_{overlap}}{\min(\|l_1\|, \|l_2\|)} > \beta.$$

(4) A distance between line binary descriptor (LBD) descriptors of $l_1$ and $l_2$ is less than a specific threshold.

It should be noted that, the line segment in this embodiment of this application is described by using an LBD method, and therefore, a distance between two line segments is represented by using a distance between LBD descriptors of the two line segments.

Step 22: Predict a first pose of the camera device by using the feature points.

In one embodiment, after feature points of two adjacent video image frames are extracted, two feature point sets are obtained. Matching is performed on the two feature point sets, and motion of the camera device is estimated. Base on motion estimation, the first pose of the camera device is predicted. Further, if the camera device is a binocular camera, optionally, the motion of the camera is estimated by using a perspective-n-point algorithm (PnP) method, and iterative solution is performed by using a non-linear optimization method, to obtain the first pose, namely, estimations of a rotation R and a translation T that are of the camera device.

Step 23: Observe a first feature line, to determine a feature line observation quantity of the first feature line, where the first feature line is any one of the extracted feature lines.

In one embodiment, the extracted first feature line is minimally represented by using orthogonal parameters, to obtain the feature line observation quantity.

Step 24: Obtain a global feature line state vector set in the current visual image frame, where the global feature line state vector set includes feature line state vectors of N historical feature lines, and N is a positive integer.

It should be noted that, a global feature line state vector set is obtained by performing loop closing detection and global optimization on outputted feature lines of key frames in consecutive visual image frames during motion of the camera device. The obtaining a global feature line state vector set in the current visual image frame includes: during motion of the camera device, when feature lines are observed in the key frame, performing association and matching on the newly observed feature lines and previously observed historical feature lines; for feature lines that succeed in matching, calculating a reprojection error (reprojection error) between each of the currently observed feature lines and each of the previously observed historical feature lines, constructing a target function by using the reprojection error, minimizing the target function to obtain feature line state vectors of the currently observed feature lines, and updating the feature line state vectors to the global feature line state vector set; and for feature lines that fail in matching, obtaining feature line state vectors of the currently observed feature lines, and adding the feature line state vectors to the global feature line state vector set.

The reprojection error is an error between a projected point (a theoretical value) and a measured point on an image. For example, during calibration, the reprojection error is often used as an evaluation standard for a final calibration effect. It is considered that a physical point on a calibration board has a theoretical value, and after projection transformation is performed on the physical point, a theoretical pixel a is obtained. A pixel obtained after distortion correction is performed on the measured point is a'. A Euclidean distance $\|a-a'\|_2$ between the two pixels represents the reprojection error.

It should be noted that, a frame is an image in a video, and a key frame is also referred to as an I frame and is a most important frame for inter-frame compression and inter-frame coding. The key frame is equivalent to a key animation drawing in a two-dimensional animation, and is a frame in which a key action in motion or a change of a character or an object is located.

Step 25: Update the first pose by using the feature line observation quantity and the global feature line state vector set, to obtain an updated first pose.

It should be noted that, when the first pose is updated by using the feature line observation quantity and the global feature line state vector set, to obtain an updated first pose, the global feature line state vector set may further be updated by using the feature line observation quantity and the first pose, to obtain an updated global feature line state vector set.

It should be noted that, before Step 25 is performed, it needs to be determined whether the foregoing observed first feature line is a previously observed feature line, and this may be implemented in the following process:

S51: Traverse feature line state vectors in the global feature line state vector set, and sequentially calculate a Mahalanobis distance between each feature line state vector and the feature line observation quantity, to obtain N Mahalanobis distances.

S52: When a smallest Mahalanobis distance in the N Mahalanobis distances is less than a preset threshold, determine that the foregoing observed first feature line is a previously observed feature line; otherwise, determine that the foregoing observed first feature line is a newly observed feature line.

Further, when the first pose of the camera device is updated by using the feature line observation quantity and the global feature line state vector set, a deviation between a feature line state vector corresponding to the smallest Mahalanobis distance and the feature line observation quantity is calculated, and the first pose and the global feature line state vector set are updated based on the deviation by using a filtering method. Optionally, a residual between the feature line state vector and the feature line observation quantity is used as the deviation between the feature line state vector and the feature line observation quantity.

If in S52, it is determined that the foregoing observed first feature line is the newly observed feature line, the feature line observation quantity is added to the global feature line state vector set, to update the global feature line state vector set.

It can be learned from the foregoing process that, according to the visual SLAM method in this embodiment of this application, feature point-based motion estimations and observation features of feature lines observed in an environment are integrated, to update a pose of the camera device in real time. In addition, observation features of observed historical feature lines are considered, so that loop closing constraints are achieved, and robustness is improved, and visual SLAM accuracy is improved.

Figure 4A:
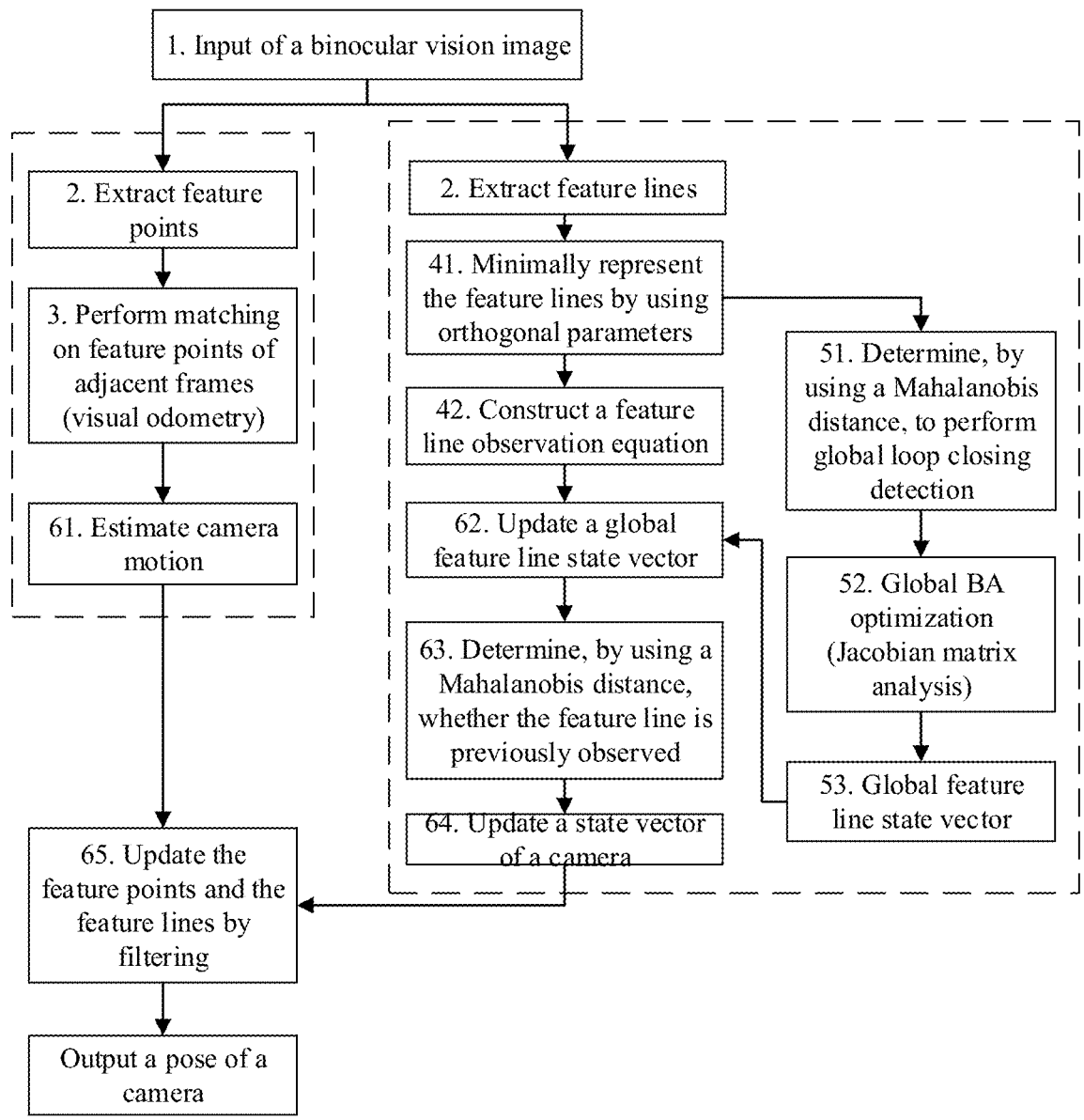
FIG. 4A is a flowchart of a visual SLAM method according to an embodiment of this application.

The following describes in detail an implementation process of FIG. 2 by using an automated driving scene of a binocular camera. For the specific implementation process, refer to FIG. 4A.

Step 1: Obtain inputs of binocular vision images of automated driving.

Step 2: Extract feature points and feature lines of features of the obtained binocular vision images.

Figure 4B:
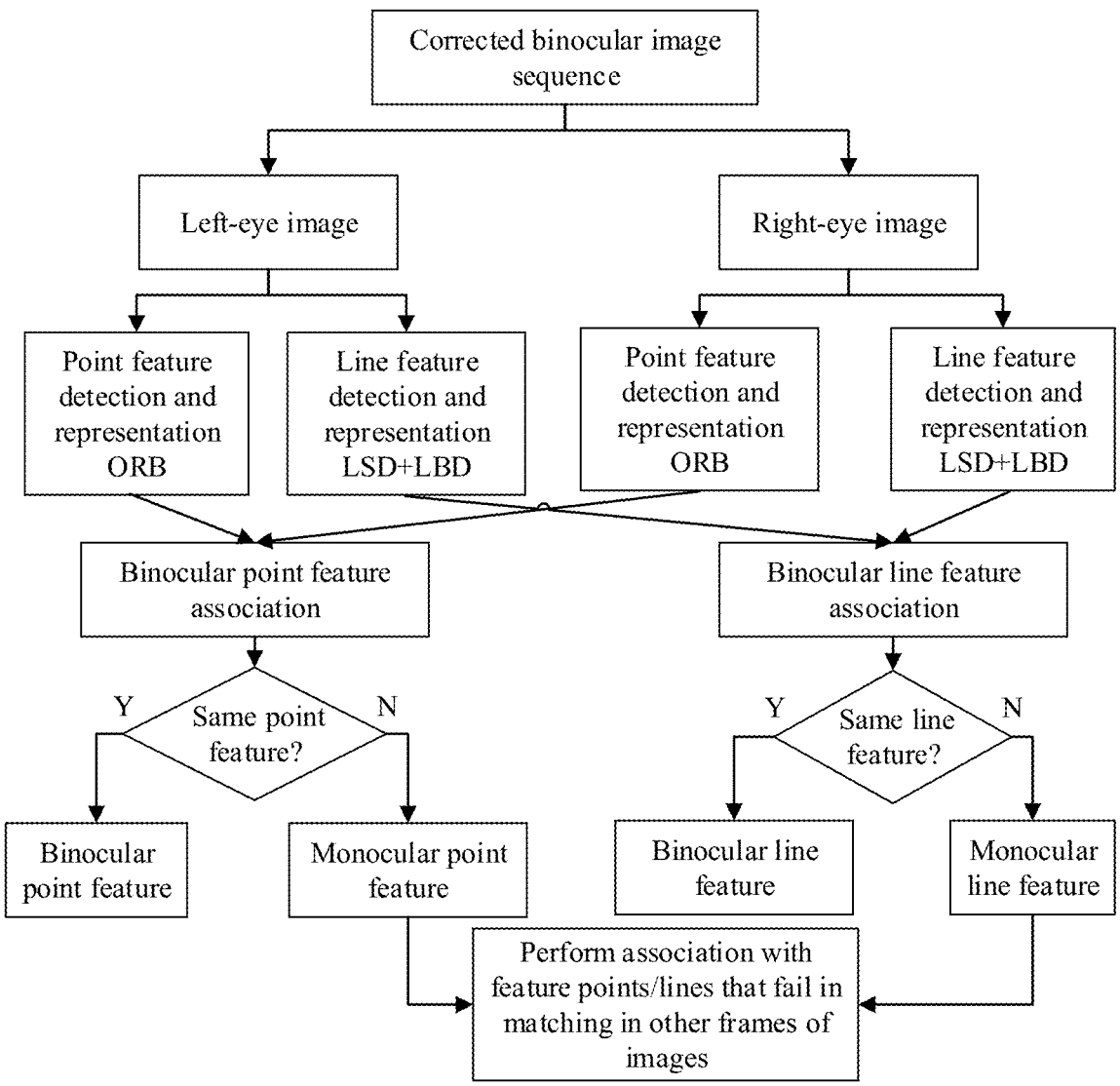
FIG. 4B is a schematic diagram of a process of matching feature points and matching feature lines according to an embodiment of this application.

It should be noted that, after the feature points and the feature lines of the binocular vision images are extracted, a process of matching feature points and matching feature lines that is shown in FIG. 4B further needs to be performed.

For example, a feature tracking module uses a corrected binocular vision image sequence as an input. For each frame of input visual images, the feature tracking module simultaneously starts four threads to extract feature points and feature lines that are of left-eye and right-eye visual images. In this embodiment, the feature points are detected, extracted, and described by using an ORB method; and the feature lines are extracted by using an improved LSD-based method and described by using an LBD descriptor. Subsequently, two threads are started. One thread performs matching on the extracted feature points. If the left-eye and right-eye images have a same feature point, the feature point is a binocular feature point, and other feature points that fail in matching are monocular feature points. The other thread performs matching on the feature lines. If a same feature line is found in both the left-eye and right-eye images, the feature line is a binocular feature line, and other feature lines that fail in matching are monocular feature lines. Matching is performed on each of the unmatched monocular feature points and unmatched monocular feature points in other key frames, and matching is performed on each of the unmatched monocular feature lines and unmatched monocular feature line in other key frames. Once the matching succeeds, a subsequent processing manner is the same as a processing manner of the binocular feature point and the binocular feature line.

Step 3: Estimate camera motion between adjacent images by using the feature points, to obtain a motion estimation of the camera.

A start position of the camera is set as an origin of a global coordinate system. Based on a result of Step 2, feature points of two adjacent video image frames are extracted, to obtain two feature point sets, and the camera motion is estimated, to obtain an equation of the camera motion.

For example, when the motion of the binocular camera is estimated by using a PnP method, iterative solution is performed by using a non-linear optimization method, to obtain the motion estimation of the camera. Herein, a rotation q and a translation p are used to represent the motion estimation of the camera, namely, a pose of the camera. The equation of the camera motion is as follows:

$$x(t)=F(t)x(t-1)$$

where $x(t)$ represents a motion pose of the camera, and $x(t)=[_G^Cq^T \ ^GP_C^T]^T$; G represents the global coordinate system. C represents a camera coordinate system; $_G^Cq$ represents an orientation of the camera in the global coordinate system and is represented by a quaternion; $^GP_C$ represents a position of the camera in the global coordinate system; F represents a state transition matrix of the camera.

$$_G^CR(t)=R\ _G^CR(t-1), \text{ and}$$

$$^GP_C(t)=_G^CR^T(t)[R\ _G^CR(t-1)^GP_C(t-1)-P],$$

where $_G^CR(t)$ is a quaternion matrix representation form of the quaternion $$_G^Cq^T; F = \begin{bmatrix} R & P \\ 0 & 1 \end{bmatrix}$$

is continuously updated as the position of the camera changes; in the first image frame, a rotation matrix R is initialized as a unit matrix, and P is 0.

Step 4: Construct an observation equation of the camera by observing the extracted feature line.

In one embodiment, Step 41 and Step 42 are included.

Step 41: Minimally observe and represent, by using orthogonal parameters, the feature line extracted in Step 2.

An orthonormal representation method for the feature line is as follows:

The feature line is represented by using Plucker (Plucker) coordinates. It is assumed that three-dimensional coordinates of two endpoints of the feature line extracted in Step 2 are represented by $X_1=(x_1, y_1, z_1,1)^T$ and $X_2=(x_2, y_2, z_2,1)^T$. The feature line is represented by using the following Plucker (plucker) coordinates:

$$L_f = \begin{bmatrix} X_1 \times X_2 \\ X_1 - X_2 \end{bmatrix} = \begin{bmatrix} n \\ v \end{bmatrix} \subset R^6,$$

where $L_f$ represents a six-dimensional vector including two three-dimensional vectors n and v, v represents a line vector $X_1-X_2$ of the feature line, and n represents a normal vector of a plane formed by the feature line and a center of the camera. After an orthonormal representation of the feature line is obtained, the orthonormal representation of the feature line is updated by using four parameters $\delta_\theta = [\delta\theta^T, \delta\phi]^T \in R^4$, where a three-dimensional vector $\theta \in R^3$ is a rotation of the feature line around three coordinate axes and is used to update n; and $\phi$ represents a vertical distance from a center point to the feature line and is used to update v.

An observation state vector of the camera is defined as x (including the pose of the camera and a feature line state vector), and an expression of the observation state vector is as follows, where $_G^Cq$ and $^GP_C$ represent a rotation of the camera and a translation of the camera respectively; $^GL_f$ represents the feature line state vector; for superscripts and subscripts, G represents a global coordinate system, C represents the camera, f represents the feature line, and L represents a line (Line):

$$x=[_G^Cq^T\ ^GP_C^T\ ^GL_f^T]^T,$$

$$^GL_f=[^GL_{f1}^T\ ^GL_{f2}^T\ ^GL_{fn}^T]^T,$$

$$^GL_{fn}=[^Gn_{Ln}^T\ ^Gv_{Ln}^T]^T,$$

$$^G\tilde{L}_f=[\delta\theta_L^T\ \delta\phi_L^T]^T, \text{ and}$$

$$\tilde{x}=[\delta_G^C\theta^T\ ^G\tilde{P}_C^T\ ^G\tilde{L}_f^T]^T,$$

where $\tilde{x}$ represents a state estimation error vector of the camera, and $^G\tilde{L}_f$ represents an estimation error vector of the feature line.

Step 42: Construct an observation equation of the feature line.

A feature line observed in an environment is projected, and $l'=[l_1\ l_2\ l_3]^T$. $l'$ represents a straight line on a camera plane after the projection, and $l_1u+l_2v+l_3=0$, where u and v are a representation of two-dimensional coordinates on the camera plane.

Coordinates of two three-dimensional endpoints of the observed feature line that are projected to the camera plane are set to $x_s$ and $x_e$, and an observation residual of the feature line is $$d(z, l') = z = \begin{bmatrix} \dfrac{x_s^T l'}{\sqrt{l_1^2+l_2^2}} & \dfrac{x_e^T l'}{\sqrt{l_1^2+l_2^2}} \end{bmatrix}^T.$$

The observation equation of the feature line is expressed by the following formula:

$z = [x_s \ x_e]^T$, and $d(z, l^f) = \left[ \dfrac{x_s^T l^f}{\sqrt{l_1^2 + l_2^2}} \ \dfrac{x_e^T l^f}{\sqrt{l_1^2 + l_2^2}} \right]^T$, where d represents a distance from the observed feature line z to l', and a smaller distance indicates a smaller estimation error.

A linearized observation equation is $\tilde{z}=d(z,l') \approx H_L \tilde{x} + H_n n$,
where $\tilde{z}$ represents a feature line observation error, $H_L$ represents a Jacobian matrix of feature line observation, and $H_n$ represents a Jacobian matrix of feature line observation noise; and $$H_n = \begin{bmatrix} \dfrac{l_1}{\sqrt{l_1^2 + l_2^2}} & \dfrac{l_2}{\sqrt{l_1^2 + l_2^2}} & 0 & 0 \\ 0 & 0 & \dfrac{l_1}{\sqrt{l_1^2 + l_2^2}} & \dfrac{l_2}{\sqrt{l_1^2 + l_2^2}} \end{bmatrix}.$$

A Jacobian matrix of feature line measurement is $$\dfrac{\partial \tilde{z}}{\partial \tilde{x}} = \dfrac{\partial \tilde{z}}{\partial \tilde{l}^f} \dfrac{\partial \tilde{l}^f}{\partial \tilde{L}_f} \dfrac{\partial \tilde{L}_f}{\partial \tilde{x}},$$

where $\dfrac{\partial \tilde{z}}{\partial \tilde{l}^f} = \dfrac{1}{l_n} \begin{bmatrix} u_1 - \dfrac{l_1 e_1}{l_n^2} & v_1 - \dfrac{l_2 e_1}{l_n^2} & 1 \\ u_2 - \dfrac{l_1 e_2}{l_n^2} & v_2 - \dfrac{l_2 e_2}{l_n^2} & 1 \end{bmatrix}$, where $e_1 = x_s^T l'$, $e_2 = x_e^T l'$, $l_n = \sqrt{(l_1^2 + l_2^2)}$, $x_s = [u_1 \ v_1 \ 1]^T$, and $x_e = [u_2 \ v_2 \ 1]^T$;

and $\dfrac{\partial l^\%}{\partial L_f \%} = [K \ 0_3]$, where K is an intrinsic parameter matrix of the camera.

An observation Jacobian matrix, namely, the observation equation of the camera, is further obtained through derivation, and is specifically expressed by the following formula, where v in the formula represents an estimation of a parameter:

$$\dfrac{\partial \tilde{z}}{\partial \tilde{x}} = \dfrac{\partial \tilde{z} \partial \tilde{l}'}{\partial \tilde{l}'} {}^C_G R [(\lfloor {}^G \hat{n} x \rfloor - \lfloor \lfloor {}^G \hat{P} x \rfloor {}^G \hat{v} x \rfloor) {}^C_G \hat{R}^T \lfloor {}^G \hat{v} x \rfloor \lfloor {}^G n x \rfloor -$$

$$\lfloor {}^G \hat{P}_C x \rfloor \lfloor {}^G v x \rfloor - ({}^G n +) \lfloor {}^G \hat{P}_C x \rfloor {}^G v].$$

Step 5: Observe feature lines in the environment, and perform global loop closing detection and global optimization on the observed feature lines, to obtain a global feature line state vector set. Specifically, the following steps are included.

Step 51: Perform data association on the feature lines by using a Mahalanobis distance between feature lines.

With the camera motion, a feature line is output in each video image frame. Association needs to be performed on the feature line and previously observed feature lines of feature line state vectors, to determine whether the feature line is a new feature line or a previously observed feature line.

In this embodiment, an association degree of two feature lines is quickly calculated by using a Mahalanobis distance-based calculation method. A specific algorithm is as follows:

$$d_m = \tilde{z}^T S^{-1} \tilde{z}.$$

In the foregoing formula, $d_m$ represents a Mahalanobis distance; S represents a covariance matrix of the observed feature line, and a specific calculation formula may be expressed as:

$$S = H_L P_x H_L^T + H_n R H_n^T.$$

$P_x$ represents a covariance matrix of an observation state vector $x = [{}^C_G q^T \ {}^G P_C^T \ {}^G L_f^T]^T$ of the camera, and R represents a covariance matrix of measurement noise, which is shown as follows:

$$R = \begin{bmatrix} \delta_u^2 & 0 & 0 & 0 \\ 0 & \delta_v^2 & 0 & 0 \\ 0 & 0 & \delta_u^2 & 0 \\ 0 & 0 & 0 & \delta_v^2 \end{bmatrix}.$$

Previously observed feature line state vectors are traversed, and corresponding Mahalanobis distances are calculated. A smallest Mahalanobis distance is selected from the Mahalanobis distances. If the smallest Mahalanobis distance is less than a specified threshold, it may be determined that the feature line is previously observed, and loop closing detection is performed; if the smallest Mahalanobis distance is not less than the specified threshold, the feature line is initialized as a new feature line.

Step 52: Perform global optimization on the observed feature lines.

An existing global optimizer (such as g2o) is used to estimate all motion poses of the camera and perform global optimization on the observed feature lines. A result of the loop closing detection in Step 51 is also an input of the optimizer. A feature line observation quantity in this application is used as one of constraints of the global optimizer, and calculation is performed on a global optimization target function and a Jacobian matrix of feature line observation. A derivation process is as follows:

(1) Determine the Global Target Optimization Function:

A position $X_{w,i}$ of a 3D point and a position $L_{w,j}$ of a 3D line are selected as vertices of a graph, a pose of the camera is $T_{kw}$, an edge of a point pose and an edge of a line pose, as two types of edges of a graph, are constructed during data association at a frond end, and reprojections of the edges are represented as follows:

$$ep_{k,i} = x_{k,i} - n(K T_{kw} X_{w,i})$$

$$el_{k,j} = d(z_{k,j}, K H_{cw} L_{w,j}).$$

In the foregoing formula, $X_{k,i}$ represents a position of a point in an image coordinate system, and n(.) represents a transformation from homogeneous coordinates to non-homogeneous coordinates. A global optimization target function C can be obtained by using the following formula, where $\Sigma p^{-1}, \Sigma l^{-1}$ represent covariance matrices of the point and the line respectively, and $\rho_p, \rho_l$ represent cost functions:

$$C = \sum_{k,i} \rho_p(ep_{k,i}^T \Sigma p_{k,i}^{-1} ep_{k,i}) + \sum_{k,j} \rho_l(el_{k,j}^T \Sigma l_{k,j}^{-1} el_{k,j}).$$

The target function is minimized, so that a feature line state vector of the currently observed feature line can be optimized and updated to the global feature line state vector set. To optimize the target function by using a non-linear optimization method, the Jacobian matrix needs to be solved for the optimization function.

(2) Analyze the Jacobian Matrix of the Observation:

First, Jacobian matrices of line reprojection errors with respect to a small pose change $\delta_\xi$ and a four-dimensional vector $\delta_\theta$ for describing an orthonormal representation update of the line need to be calculated. A derivative of a reprojection error with respect to a back-projected line $l'=[l_1, l_2, l_3]$ in a projection pixel coordinate system is as follows:

$$\frac{\partial el}{\partial l'} = \frac{1}{l_n}\begin{bmatrix} u_1 - \frac{l_1 e_1}{l_n^2} & v_1 - \frac{l_2 e_1}{l_n^2} & 1 \\ u_2 - \frac{l_1 e_2}{l_n^2} & v_1 - \frac{l_2 e_2}{l_n^2} & 1 \end{bmatrix}_{2\times 3}.$$

In the foregoing formula, $e_1 = x_s^T l'$, $e_2 = x_e^T l'$, $l_n = \sqrt{(l_1^2 + l_2^2)}$, where $x_s = [u_1, v_1, 1]^T$ and $x_e = [u_2, v_2, 1]^T$ represent two endpoints of line segments to be matched in an image coordinate system. A projection equation of the 3D line is $l' = K n_c$, and a derivative of $l'$ with respect to a line segment in a camera coordinate system is as follows:

$$\frac{\partial l'}{\partial L_c} = \frac{\partial K n_c}{\partial L_c} = [K \ 0]_{3\times 6}.$$

An orthonormal representation of a line segment in a world coordinate system is set as follows:

$$U = \begin{bmatrix} u_{11} & u_{12} & u_{13} \\ u_{21} & u_{22} & u_{23} \\ u_{31} & u_{32} & u_{33} \end{bmatrix}, W = \begin{bmatrix} w_1 & -w_2 \\ w_2 & w_1 \end{bmatrix}.$$

It can be learned from a transformation equation $L_c = H_{cw} L_w$ that, a Jacobian matrix of $L_c$ with respect to $L_w$ is as follows:

$$\frac{\partial L_w}{\partial \delta_\theta} = \begin{bmatrix} -[w_1 u_1]_x & -w_2 u_1 \\ -[w_2 u_2]_x & -w_1 u_2 \end{bmatrix}_{6\times 4}.$$

In the foregoing formula, $u_i$ is an $i^{th}$ column of U.

It is relatively difficult to directly calculate a derivative $$\frac{\partial L_w}{\partial \delta_\zeta}.$$

Therefore, in this application, $\delta_\xi$ is divided into a translation change part $\delta_\rho$ and a rotation change part $\delta_\phi$. During calculation of a derivative with respect to a translation amount $\delta_\rho$, it is assumed that a rotation amount is 0. Similarly, during calculation of a derivative with respect to a rotation amount, it is assumed that a translation amount is 0. First, the derivative with respect to the translation amount is calculated. A transformation matrix $T^*$ including the translation amount $\delta_\rho$, a rotation matrix $R^*$, a translation amount $t^*$, a line transformation matrix $H^*_{cw}$, and coordinates of a transformed line are as follows:

$$T^* = \exp(\hat{\delta_\xi}) T_{cw} \approx \begin{bmatrix} I & \delta_\rho \\ 0^T & 1 \end{bmatrix} T_{cw},$$

$$R^* = R_{cw}, t^* = \delta_\rho + t_{cw},$$

$$H^*_{cw} = \begin{bmatrix} R_{cw} & [\delta_\rho + t_{cw}]_x R_{cw} \\ 0 & R_{cw} \end{bmatrix}, \text{ and}$$

$$L^*_c = H^*_{cw} L_w = \begin{bmatrix} R_{cw} n_w + [\delta_\rho + t_{cw}]_x R_{cw} v_w \\ R^T_{cw} v_w \end{bmatrix}.$$

In the foregoing formula, $\exp(\delta_\xi^\wedge)$ represents a Lie group corresponding to a Lie algebra $\delta_\xi^\wedge$. Then, the derivative with respect to $\delta_\rho$ may be calculated as follows:

$$\frac{\partial L^*_c}{\partial \delta_\rho} = \begin{bmatrix} \frac{[\delta_\rho + t_{cw}]_x R_{cw} v_w}{\partial \delta_\rho} \\ 0 \end{bmatrix} = \begin{bmatrix} -[R_{cw} v_w]_x \\ 0 \end{bmatrix}_{6\times 3}.$$

Calculating $$\frac{\partial L^*_c}{\partial \delta_\phi}$$

is similar to calculating $$\frac{\partial L^*_c}{\partial \delta_\rho},$$

and a calculation result is as follows:

$$\frac{\partial L^*_c}{\partial \delta_\phi} = \begin{bmatrix} -[Rn]_x - [[t]_x Rv]_x \\ -[Rv]_x \end{bmatrix}_{6\times 3}.$$

Finally, a Jacobian matrix with respect to $\delta_\xi$ is as follows:

$$\frac{\partial L^*_c}{\partial \delta_\xi} = \begin{bmatrix} -[Rn]_x - [[t]_x Rv]_x & -[Rv]_x \\ -[Rv]_x & 0 \end{bmatrix}_{6\times 6}.$$

According to a derivation rule and based on the foregoing descriptions, in this application, Jacobian matrices of reprojection errors with respect to a line parameter and the pose change are as follows:

$$Jl_\xi = \frac{\partial e_l}{\partial \delta_\xi} = \frac{\partial e_l}{\partial l'} \frac{\partial l'}{\partial L_c} \frac{\partial L_c}{\partial \delta_\xi}, \text{ and}$$

$$Jl_\theta = \frac{\partial e_l}{\partial \delta_\theta} = \frac{\partial e_l}{\partial l'} \frac{\partial l'}{\partial L_c} \frac{\partial L_c}{\partial L_w} \frac{\partial L_w}{\partial \delta_\theta}.$$

After the Jacobian matrices are calculated, a non-linear method such as a Gauss-Newton algorithm may be used to obtain an optimal feature line state vector and the pose of the camera through iterative solution.

Step 53: Update the global feature line state vector set based on a result of Step 52.

Step 6: Update an observation state of the camera in a filtering SLAM manner by using a motion estimation of the feature point and the feature line observation quantity of the feature line, to track the camera motion.

A specific implementation process of Step 6 is described by using an example.

Step 61: Obtain the pose of the camera based on Step 3.

In Step 3, matching can be performed on feature points of two adjacent visual image frames based on feature points observed at a moment T and feature points observed at a moment T−1 and by using a visual odometry method, to obtain a pose estimation $x=[_G^C q^T \ ^G P_C^T]^T$ from the moment T−1 to the moment T.

Step 62: If a global feature line state vector set is updated at the back end at the moment T, update the global feature line state vector set $^G L_f = [^G L_{f1}^T \ ^G L_{f2}^T \ ^G L_{fm}^T]^T$.

Step 63: Represent m feature lines observed at the moment T as $^G L_f(T) = [^G L_{f1}^T(T) \ ^G L_{f2}^T(T) \ ^G L_{fm}^T(T)]^T$, calculate an observation residual $\tilde{z}$ and a covariance matrix $H_L$ of each observed feature line in combination with the global feature line state vector set $^G L_f$, and determine a data association degree of the feature lines by using a Mahalanobis distance, to determine whether the observed feature line is a previously observed feature line.

Step 64: If the observed feature line is a newly observed feature line, update the feature line to the global feature line state vector set $^G L_f$, and update a state vector of the camera; or if the observed feature line is a previously observed feature line, calculate an observation residual $\tilde{z}$ and a Jacobian matrix $H_L$ that are of the feature line.

Step 65: Optimize the state vector $x=[_G^C q^T \ ^G P_C^T \ ^G L_f^T]^T$ of the camera based on the pose estimation $x=[_G^C q^T \ ^G P_C^T]^T$ at the moment T by using the observation residual $\tilde{z}$ and the Jacobian matrix $H_L$ that are of the feature line, and a covariance matrix R and a Jacobian matrix $H_n$ that are of observation noise.

In one embodiment, an EKF filtering method is used as an example for description. A state covariance estimation $\hat{P}_x(T) = F P_x(T-1) F^T$ of the camera is calculated through iteration by using a state covariance matrix $P_x$ of the camera and a state transition matrix F of the camera. Then, an updated Kalman gain $K(T) = \hat{P}_x H_L^T (H_L \hat{P}_x H_L^T + H_N R H_N)^{-1}$ is obtained through iteration by using the Jacobian matrix $H_L$ of feature line observation, the state covariance estimation $\hat{P}_x$ of the camera, the covariance matrix R of the observation noise, and the Jacobian matrix $H_n$ of noise. The state covariance matrix is updated by using the updated Kalman gain and the Jacobian matrix $H_L$ of the feature line observation, to obtain $P_x(T) = (I - K(T) H_L) \hat{P}_x^T$, and continuously update the Kalman gain and the state covariance matrix $P_x$ through iteration. The state vector $x=[_G^C q^T \ ^G P_C^T \ ^G L_f^T]^T$ of the camera is optimized by using the updated Kalman gain and the observation residual $\tilde{z}$ of the feature line.

In conclusion, in the existing visual SLAM solution, camera motion is estimated by using the visual odometry method, and a loop closing constraint and a map observation error are not considered. In the feature tracking module of this application, feature point-based camera inter-frame motion estimations and observation vectors of feature lines in an environment are integrated based on a filtering framework. In the filtering framework, a feature line map is maintained, and the feature line map and observation of a pose of the camera are simultaneously optimized. A real-time association between the line map and camera motion is maintained, and system real-time performance and robust loop closing detection are ensured. Motion tracking and estimation precision is improved through loop closing detection of SLAM.

In addition, during analysis and solution of a feature line representation and an observation error, the orthonormal representation method is used to minimally parameterize projection error of 3D line features, and a mathematical analysis method is used to calculate a Jacobian matrix of an observation variable, to reduce an optimization variable quantity and improve precision, stability, and efficiency of back-end optimization.

Based on a same idea, this application further provides a visual SLAM apparatus based on point and line features, where the apparatus is applied to a camera device for capturing images of surroundings. The apparatus may be configured to perform the corresponding method embodiments in FIG. 2 to FIG. 4B. Therefore, for an implementation of the visual SLAM apparatus provided in this embodiment of this application, refer to the implementations of the method. Details are not repeatedly described.

Figure 5:
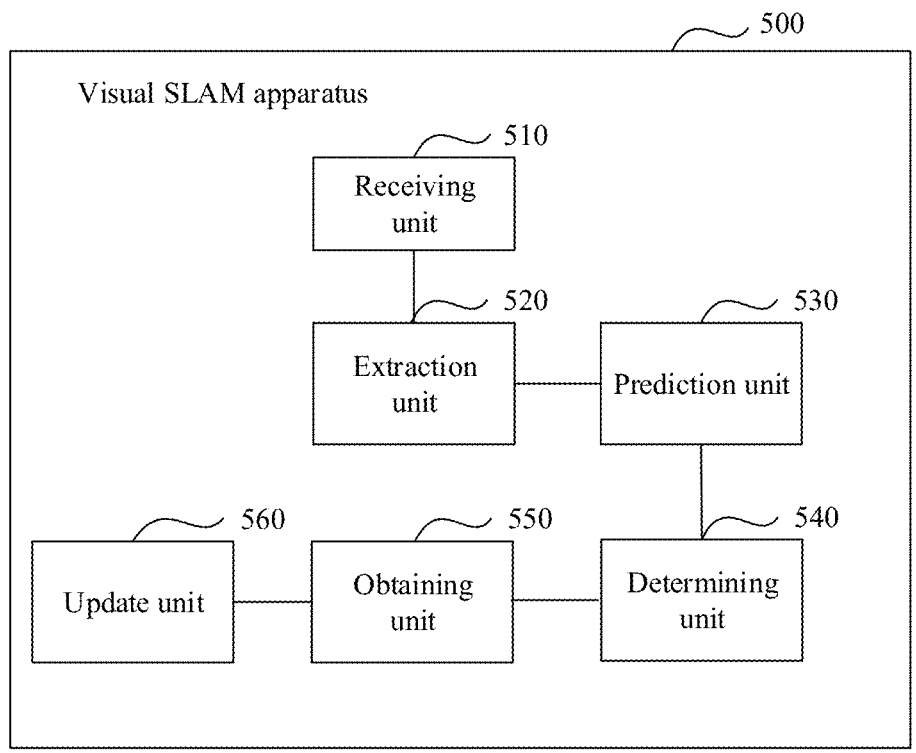
FIG. 5 is a structural diagram of a visual SLAM apparatus based on point and line features according to an embodiment of this application.

FIG. 5 shows a visual SLAM apparatus 500 based on point and line features according to an embodiment of this application. The apparatus 500 includes a receiving unit 510, an extraction unit 520, a prediction unit 530, a determining unit 540, an obtaining unit 550, and an update unit 560.

The receiving unit 510 is configured to receive a current visual image frame input by a camera.

The extraction unit 520 is configured to extract feature points and feature lines of the current visual image frame.

The prediction unit 530 is configured to predict a first pose of a camera device by using the feature points.

The determining unit 540 is configured to observe a first feature line, to determine a feature line observation quantity of the first feature line, where the first feature line is any one of the extracted feature lines.

The obtaining unit 550 is configured to obtain a global feature line state vector set in the current visual image frame, where the global feature line state vector set includes feature line state vectors of N historical feature lines, and N is a positive integer.

The update unit 560 is configured to update the first pose by using the feature line observation quantity and the global feature line state vector set, to obtain an updated first pose.

In one embodiment, the update unit 560 is further configured to:

update the global feature line state vector set by using the feature line observation quantity and the first pose, to obtain an updated global feature line state vector set.

In one embodiment, the determining unit 540 is further configured to:

traverse the N historical feature lines, and sequentially calculate a Mahalanobis distance between each historical feature line and the first feature line, to obtain N Mahalanobis distances; and the update unit 560 is specifically configured to: when a smallest Mahalanobis distance in the N Mahalanobis distances is less than a preset threshold, update the first pose by using the feature line observation quantity and the global feature line state vector set, to obtain the updated first pose.

In one embodiment, the update unit 560 is specifically configured to:

calculate a deviation between a feature line state vector of a feature line corresponding to the smallest Mahalanobis distance and the feature line observation quantity; and update the first pose and the global feature line state vector set based on the deviation by using a filtering method.

In one embodiment, the update unit 560 is further configured to: when the smallest Mahalanobis distance in the N Mahalanobis distances is not less than the preset threshold, add the feature line observation quantity to the global feature line state vector set, to obtain the updated global feature line state vector set.

In one embodiment, in terms of extracting feature lines of the current visual image frame, the extraction unit 520 is specifically configured to:

extract all line segments of the current visual image frame;

merge, if any two extracted line segments satisfy a first preset condition, the any two line segments into a new line segment until there is no line segment that satisfies the first preset condition; and output, if the any two merged line segments satisfy a second preset condition, the any two merged line segments as a same feature line; or output, if the any two merged line segments do not satisfy the second preset condition, the any two line segments as two feature lines.

In one embodiment, in terms of merging, if any two extracted line segments satisfy a first preset condition, the any two line segments into a new line segment, the extraction unit 520 is configured to:

if a minimum distance between endpoints of the any two extracted line segments is less than a first preset value, a distance between the two line segments is less than a second preset value, and an angle between the any two line segments is less than a third preset value, merge the any two line segments into the new line segment.

In one embodiment, in terms of outputting, if the any two merged line segments satisfy a second preset condition, the any two merged line segments as a same feature line, the extraction unit 520 is specifically configured to:

if an angle between the any two merged line segments is less than a fourth preset value, lengths of the two line segments are the same, an overlap of the two line segments is greater than a fifth preset value, and a distance between the two line segments is less than a sixth preset value, output the any two line segments as the same feature line.

In one embodiment, the determining unit 540 is configured to:

minimally represent the extracted feature lines by using orthogonal parameters, to obtain the feature line observation quantity.

In one embodiment, the obtaining unit 550 is configured to:

during motion of the camera device, when the current visual image frame is a key frame and feature lines are observed in the current visual image frame, perform association and matching on the currently observed feature lines and previously observed historical feature lines, where the key frame is a frame in which a key action occurs during the motion of the camera device; for feature lines that succeed in matching, calculate a reprojection error between each of the currently observed feature lines and each of the previously observed historical feature lines, construct a target function by using the reprojection error, minimize the target function to obtain feature line state vectors of the currently observed feature lines, and update the feature line state vectors to the global feature line state vector set; and for feature lines that fail in matching, obtain feature line state vectors of the currently observed feature lines, and add the feature line state vectors to the global feature line state vector set.

Figure 6:
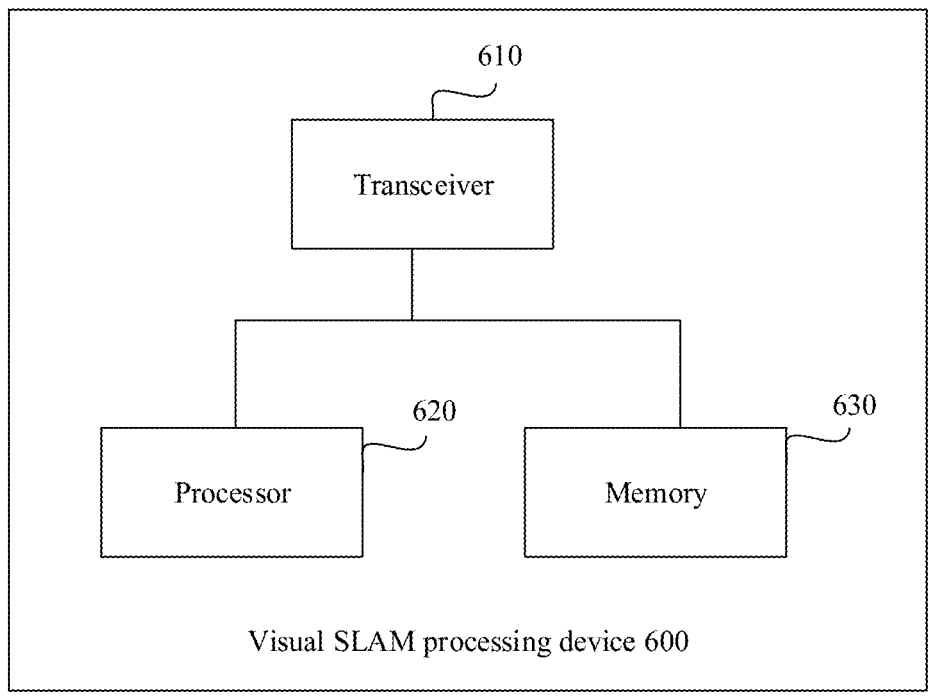
FIG. 6 is a structural diagram of a visual SLAM processing device based on point and line features according to an embodiment of this application.

Based on a same idea, FIG. 6 shows a visual SLAM processing device 600 based on point and line features according to an embodiment of this application. The device 600 includes a transceiver 610, a processor 620, and a memory 630. The memory 630 is configured to store a program, an instruction, or code. The processor 620 is configured to execute the program, the instruction, or the code in the memory 630.

The transceiver 610 is configured to receive a current visual image frame input by a camera.

The processor 620 is configured to: extract feature points and feature lines of the current visual image frame; predict a first pose of an camera device by using the feature points; observe a first feature line, to determine a feature line observation quantity of the first feature line, where the first feature line is any one of the extracted feature lines; obtain a global feature line state vector set in the current visual image frame, where the global feature line state vector set includes feature line state vectors of N historical feature lines, and N is a positive integer; and update the first pose by using the feature line observation quantity and the global feature line state vector set, to obtain an updated first pose.

The processor 620 may be an integrated circuit chip and has a signal processing capability. In an implementation process, steps in the foregoing methods can be implemented by using a hardware integrated logic circuit in the processor 620, or by using instructions in a form of software. The processor 620 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 602 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 630. The processor 620 reads information in the memory 630, and performs the foregoing method steps in combination with hardware of the processor 620.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a magnetic disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that the person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A computer-implemented method of visual simultaneous localization and mapping (SLAM) based on point and line features for a camera device for capturing images of surroundings, the method comprising:
   receiving a current visual image frame input by a camera device;
   extracting feature points and feature lines from the current visual image frame;
   predicting a first pose of the camera device using the feature points;
   observing a first feature line to determine a feature line measurement of the first feature line, wherein the first feature line is one of the extracted feature lines;
   obtaining a global feature line state vector set in the current visual image frame, wherein the global feature line state vector set comprises feature line state vectors of N historical feature lines, and N is a positive integer, wherein the N historical feature lines comprise N previously observed historical feature lines; and
   updating the first pose using the feature line measurement and the global feature line state vector set to obtain an updated first pose.

2. The method according to claim 1, further comprising:
   updating the global feature line state vector set using the feature line measurement and the first pose to obtain an updated global feature line state vector set.

3. The method according to claim 1, further comprising:
   traversing the N historical feature lines, and sequentially calculating a Mahalanobis distance between each historical feature line and the first feature lines to obtain N Mahalanobis distances; and
   wherein updating the first pose using the feature line measurement and the global feature line state vector set to obtain the updated first pose comprises:
   when a smallest Mahalanobis distance in the N Mahalanobis distances is less than a preset threshold, updating the first pose using the feature line measurement and the global feature line state vector set to obtain the updated first pose.

4. The method according to claim 3, wherein updating the first pose using the feature line measurement and the global feature line state vector set to obtain the updated first pose further comprises:
   calculating a deviation between a feature line state vector of a feature line corresponding to the smallest Mahalanobis distance and the feature line measurement; and
   using a filtering method that updates the first pose and the global feature line state vector set based on the deviation.

5. The method according to claim 3, further comprising:
   when the smallest Mahalanobis distance in the N Mahalanobis distances is not less than the preset threshold, adding the feature line measurement to the global feature line state vector set to obtain an updated global feature line state vector set.

6. The method according to claim 1, wherein extracting the feature lines from the current visual image frame comprises:
   extracting all line segments from the current visual image frame;
   if any two of the extracted line segments satisfy a first preset condition, merging the two extracted line segments into a new line segment until there is no line segment that satisfies the first preset condition; and
   if any two merged line segments satisfy a second preset condition, outputting the two merged line segments as a same feature line; or if the two merged line segments do not satisfy the second preset condition, outputting the two merged line segments as two feature lines.

7. The method according to claim 6, wherein merging the two line segments into the new line segment comprises:
   if a minimum distance between endpoints of the two extracted line segments is less than a first preset value, a distance between the two extracted line segments is less than a second preset value, and an angle between the two extracted line segments is less than a third preset value, merging the two extracted line segments into the new line segment.

8. The method according to claim 6, wherein outputting the two merged line segments as the same feature line comprises:
   if an angle between the two merged line segments is less than a fourth preset value, lengths of the two merged line segments are the same, an overlap of the two merged line segments is greater than a fifth preset value, and a distance between the two merged line segments is less than a sixth preset value, outputting the two merged line segments as the same feature line.

9. The method according to claim 1, wherein obtaining the global feature line state vector set in the current visual image frame comprises:
   during motion of the camera device, when the current visual image frame is a key frame and the feature lines are observed in the current visual image frame, performing association and matching on currently observed feature lines and the previously observed historical feature lines, wherein the key frame is a frame in which a key action occurs during the motion of the camera device;

for feature lines that succeed in matching, calculating a reprojection error between each of the feature lines that succeed in matching and each of the previously observed historical feature lines, constructing a target function using the reprojection error, minimizing the target function to obtain feature line state vectors of the feature lines that succeed in matching, and updating the feature line state vectors to the global feature line state vector set; and for feature lines that fail in matching, obtaining feature line state vectors of the currently observed feature lines, and adding the feature line state vectors to the global feature line state vector set.

10. An apparatus, comprising:
a processor; and
a memory coupled to the processor to store instructions, which when executed by the processor, cause the processor to perform operations, the operations including
receiving a current visual image frame input by a camera device;
extracting feature points and feature lines from the current visual image frame;
predicting a first pose of the camera device using the feature points;
observing a first feature line to determine a feature line measurement of the first feature line, wherein the first feature line is one of the extracted feature lines;
obtaining a global feature line state vector set in the current visual image frame, wherein the global feature line state vector set comprises feature line state vectors of N historical feature lines, and N is a positive integer, wherein the N historical feature lines comprise N previously observed historical feature lines; and
updating the first pose using the feature line measurement and the global feature line state vector set to obtain an updated first pose.

11. The apparatus according to claim 10, wherein the operations further include:
updating the global feature line state vector set using the feature line measurement and the first pose to obtain an updated global feature line state vector set.

12. The apparatus according to claim 10, wherein the operations further include:
traversing the N historical feature lines, and sequentially calculating a Mahalanobis distance between each historical feature line and the first feature line to obtain N Mahalanobis distances; and
wherein updating the first pose using the feature line measurement and the global feature line state vector set to obtain the updated first pose comprises: when a smallest Mahalanobis distance in the N Mahalanobis distances is less than a preset threshold, updating the first pose using the feature line measurement and the global feature line state vector set to obtain the updated first pose.

13. The apparatus according to claim 12, wherein updating the first pose using the feature line measurement and the global feature line state vector set to obtain the updated first pose further comprises:

calculating a deviation between a feature line state vector of a feature line corresponding to the smallest Mahalanobis distance and the feature line measurement; and
using a filtering method that updates the first pose and the global feature line state vector set based on the deviation.

14. The apparatus according to claim 12, wherein the operations further comprise: when the smallest Mahalanobis distance in the N Mahalanobis distances is not less than the preset threshold, adding the feature line measurement to the global feature line state vector set to obtain the updated global feature line state vector set.

15. The apparatus according to claim 10, wherein extracting the feature lines from the current visual image frame comprises:
extracting all line segments from the current visual image frame;
if any two extracted line segments satisfy a first preset condition, merging the two extracted line segments into a new line segment until there is no line segment that satisfies the first preset condition; and
if any two merged line segments satisfy a second preset condition, outputting the two merged line segments as a same feature line; or if the two merged line segments do not satisfy the second preset condition, outputting the two line segments as two feature lines.

16. The apparatus according to claim 15, wherein merging the two extracted line segments into the new line segment comprises:
if a minimum distance between endpoints of the two extracted line segments is less than a first preset value, a distance between the two extracted line segments is less than a second preset value, and an angle between the two extracted line segments is less than a third preset value, merging the two extracted line segments into the new line segment.

17. The apparatus according to claim 15, wherein outputting the two merged line segments as the same feature line comprises:
if an angle between the two merged line segments is less than a fourth preset value, lengths of the two merged line segments are the same, an overlap of the two merged line segments is greater than a fifth preset value, and a distance between the two merged line segments is less than a sixth preset value, outputting the two merged line segments as the same feature line.

18. The apparatus according to claim 10, wherein obtaining the global feature line state vector set in the current visual image frame comprises:
during motion of the camera device, when the current visual image frame is a key frame and the feature lines are observed in the current visual image frame, performing association and matching on currently observed feature lines and the previously observed historical feature lines, wherein the key frame is a frame in which a key action occurs during the motion of the camera device;
for feature lines that succeed in matching, calculating a reprojection error between each of the currently observed feature lines and each of the previously observed historical feature lines, constructing a target function using the reprojection error, minimizing the target function to obtain feature line state vectors of the currently observed feature lines, and updating the feature line state vectors to the global feature line state vector set; and for feature lines that fail in matching, obtaining feature line state vectors of the currently observed feature lines, and adding the feature line state vectors to the global feature line state vector set.

19. A non-transitory computer storage medium that stores computer executable instructions, and when the computer executable instructions are run on a computer, cause the computer to perform the method according to claim 1.

* * * * *